United States Patent
Campbell et al.

(10) Patent No.: US 9,488,215 B2
(45) Date of Patent: Nov. 8, 2016

(54) FIXED SHAFT FOR HYDRAULIC UNIT

(71) Applicant: Hamilton Sundstrand Corporation, Charlotte, NC (US)

(72) Inventors: Kris H. Campbell, Poplar Grove, IL (US); Glenn C. Lemmers, Jr., Loves Park, IL (US); Mark J. Franklin, Janesville, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 40 days.

(21) Appl. No.: 14/551,983

(22) Filed: Nov. 24, 2014

(65) Prior Publication Data

US 2016/0146243 A1    May 26, 2016

(51) Int. Cl.
| F16C 3/02 | (2006.01) |
| F04B 1/20 | (2006.01) |
| F16H 39/14 | (2006.01) |
| F16C 33/58 | (2006.01) |
| F16C 19/26 | (2006.01) |

(52) U.S. Cl.
CPC . *F16C 3/02* (2013.01); *F04B 1/20* (2013.01); *F04B 1/2014* (2013.01); *F16C 33/581* (2013.01); *F16C 33/585* (2013.01); *F16H 39/14* (2013.01); *F16C 19/26* (2013.01)

(58) Field of Classification Search
CPC .................................................. F16C 3/02
USPC ............. 464/179, 183; 60/487; 475/72; 310/75 R, 75 D
See application file for complete search history.

(56) References Cited

U.S. PATENT DOCUMENTS

| 2,848,882 | A | * | 8/1958 | Larsen | F16C 3/02 |
| 4,252,035 | A | * | 2/1981 | Cordner | B64D 41/00 475/72 |
| 5,247,794 | A | * | 9/1993 | Benson | F16H 39/14 60/487 |
| 2014/0008170 | A1 | * | 1/2014 | Vanderzyden | F16D 9/08 |

FOREIGN PATENT DOCUMENTS

| DE | 943 866 | * | 6/1956 |
| GB | 13827 | * | 7/1892 |

* cited by examiner

*Primary Examiner* — Gregory Binda
(74) *Attorney, Agent, or Firm* — Cantor Colburn LLP

(57) ABSTRACT

A fixed shaft of a hydraulic unit is provided including a body having a first end and a second opposite end. A first flange and a substantially identical second flange are integrally formed with the body of the shaft adjacent the second end. The second end of the body has an outer diameter of 0.990±0.005 inches (2.515±0127 cm). The first and second flange each have an axial length parallel to a longitudinal axis of the body of about 0.085±0.010 inches (0.216±0.0254 cm). The first and second flange having an outer diameter of 1.359 inches (3.452 cm). The first flange and the second flange are separated by from one another by a distance of about 0.3162 inches (0.8031 cm). The portion of the body between the first flange and the second flange has an outer diameter of about 1.2013 inches (3.051 cm).

5 Claims, 7 Drawing Sheets

US 9,488,215 B2

FIXED SHAFT FOR HYDRAULIC UNIT

BACKGROUND OF THE INVENTION

Exemplary embodiments of this invention generally relate to an integrated drive generator, and more particularly, to a fixed shaft of a hydraulic unit of an integrated drive generator.

Aircrafts currently rely on electrical, pneumatic, and hydraulic systems for secondary power. A typical electrical system utilizes an integrated drive generator (IDG) coupled to each engine to provide a fixed frequency power to the distribution system and loads. One type of IDG includes a generator, a hydraulic unit, and a differential assembly arranged in a common housing. The differential assembly is operably coupled to a gas turbine engine via an input shaft. The rotational speed of the input shaft varies during the operation of the gas turbine engine. The hydraulic unit cooperates with the differential assembly to provide a constant speed to the generator throughout engine operation.

Due to packaging constraints, components of the hydraulic unit, such as nested, coaxial, variable and fixed shafts must be redesigned.

BRIEF DESCRIPTION OF THE INVENTION

According to one embodiment of the invention, a fixed shaft of a hydraulic unit is provided including a body having a first end and a second opposite end. A first flange and a substantially identical second flange are integrally formed with the body of the shaft adjacent the second end. The second end of the body has an outer diameter of 0.990±0.005 inches (2.515±0127 cm). The first and second flange each have an axial length parallel to a longitudinal axis of the body of about 0.085±0.010 inches (0.216±0.0254 cm). The first and second flange having an outer diameter of 1.359 inches (3.452 cm). The first flange and the second flange are separated by from one another by a distance of about 0.3162 inches (0.8031 cm). The portion of the body between the first flange and the second flange has an outer diameter of about 1.2013 inches (3.051 cm).

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
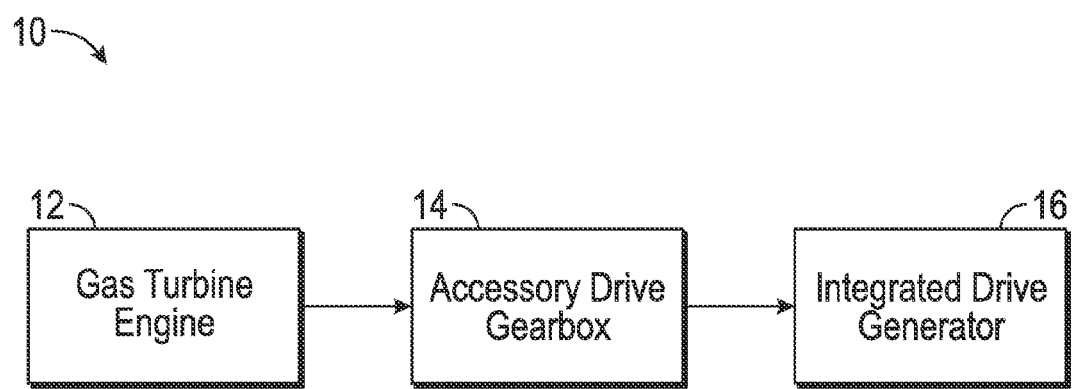
FIG. 1 is a schematic diagram of a generator system of an aircraft.

Referring now to FIG. 1, an example of a generator system 10 is schematically illustrated. The system 10 includes a gas turbine engine 12 that provides rotational drive to an integrated drive generator (IDG) 16 through an accessory drive gearbox 14 mounted on the gas turbine engine 12. The accessory drive gearbox is coupled to a spool of the engine 12, and the speed of the spool varies throughout the entire engine operation.

Figure 2:
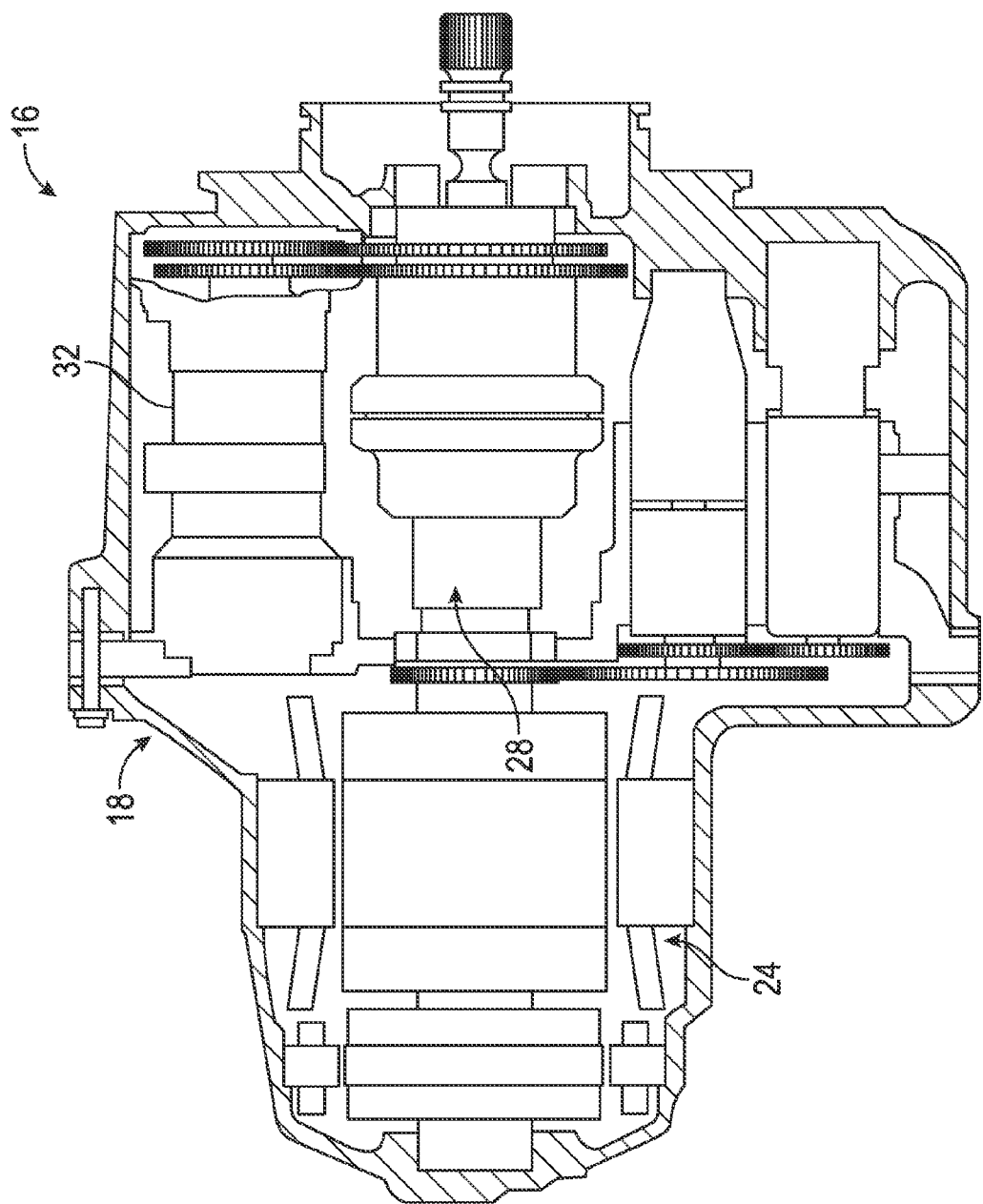
FIG. 2 is a cross-sectional schematic view of an example of an integrated drive generator (IDG)

An example of an IDG 16 including a housing 18 is shown in FIG. 2. In the illustrated embodiment, the IDG 16 includes an input shaft configured to receive rotational drive from the accessory drive gearbox 14. The rotational speed of the input shaft varies depending upon the operation of the engine. To this end, a hydraulic unit 32 cooperates with the differential assembly 28 to convert the variable rotational speed from the input shaft to a fixed rotational output speed to the generator 24.

Figure 3:
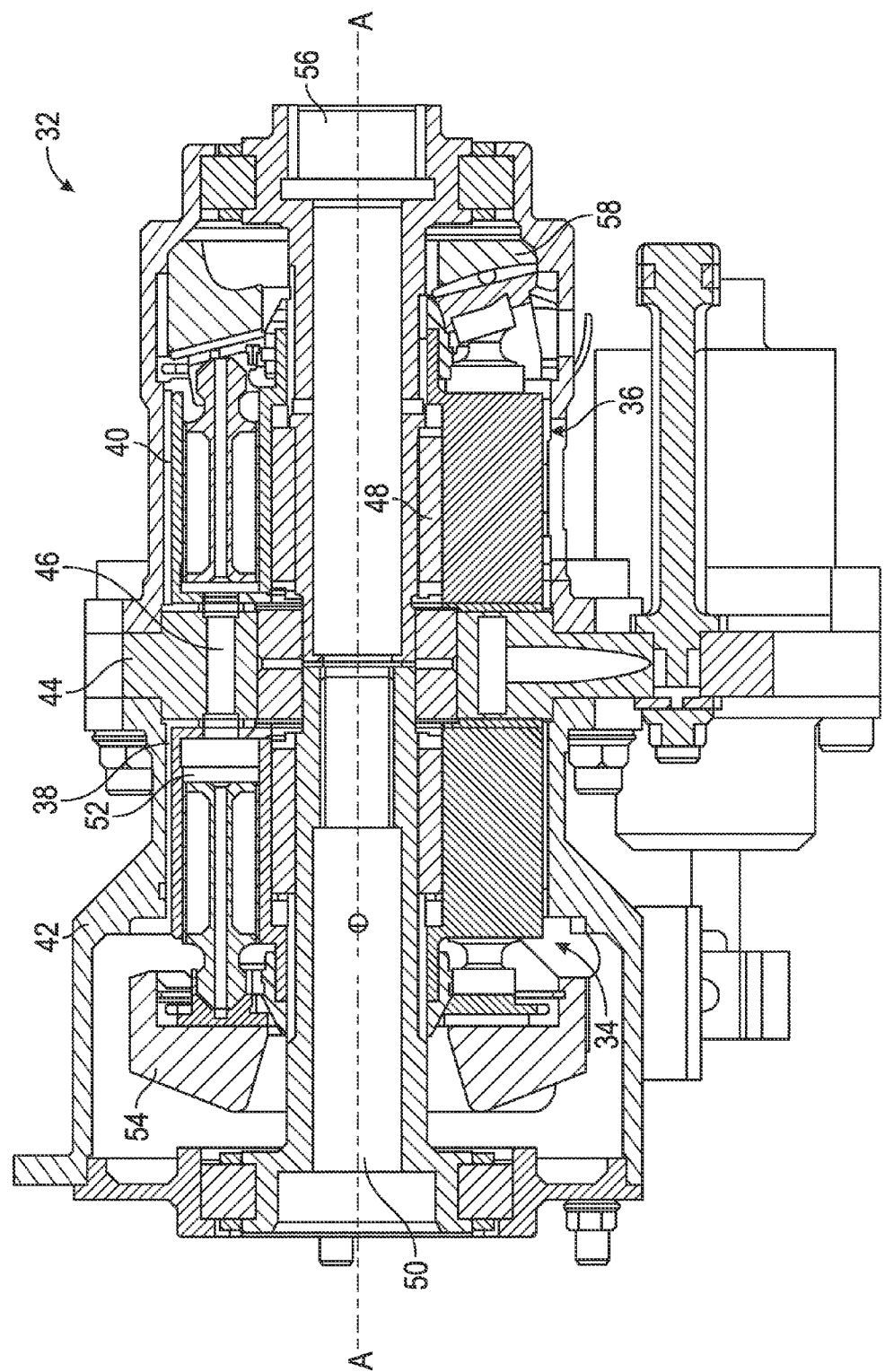
FIG. 3 is a cross-sectional view of an example of a hydraulic unit of an integrated drive generator.
Figure 4:
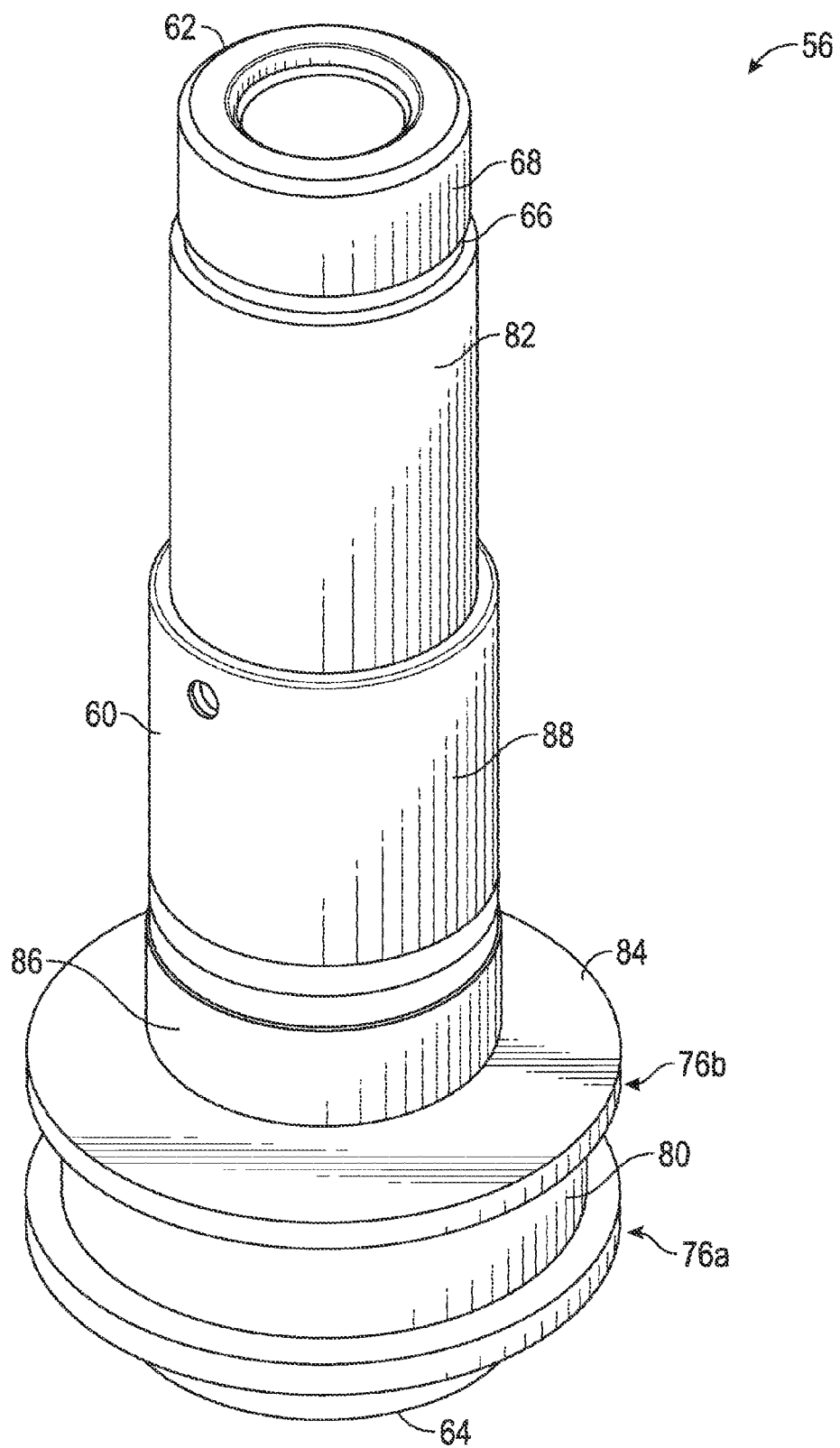
FIG. 4 is a perspective view of a fixed shaft configured for use in a hydraulic unit according to an embodiment of the invention.
Figure 5:
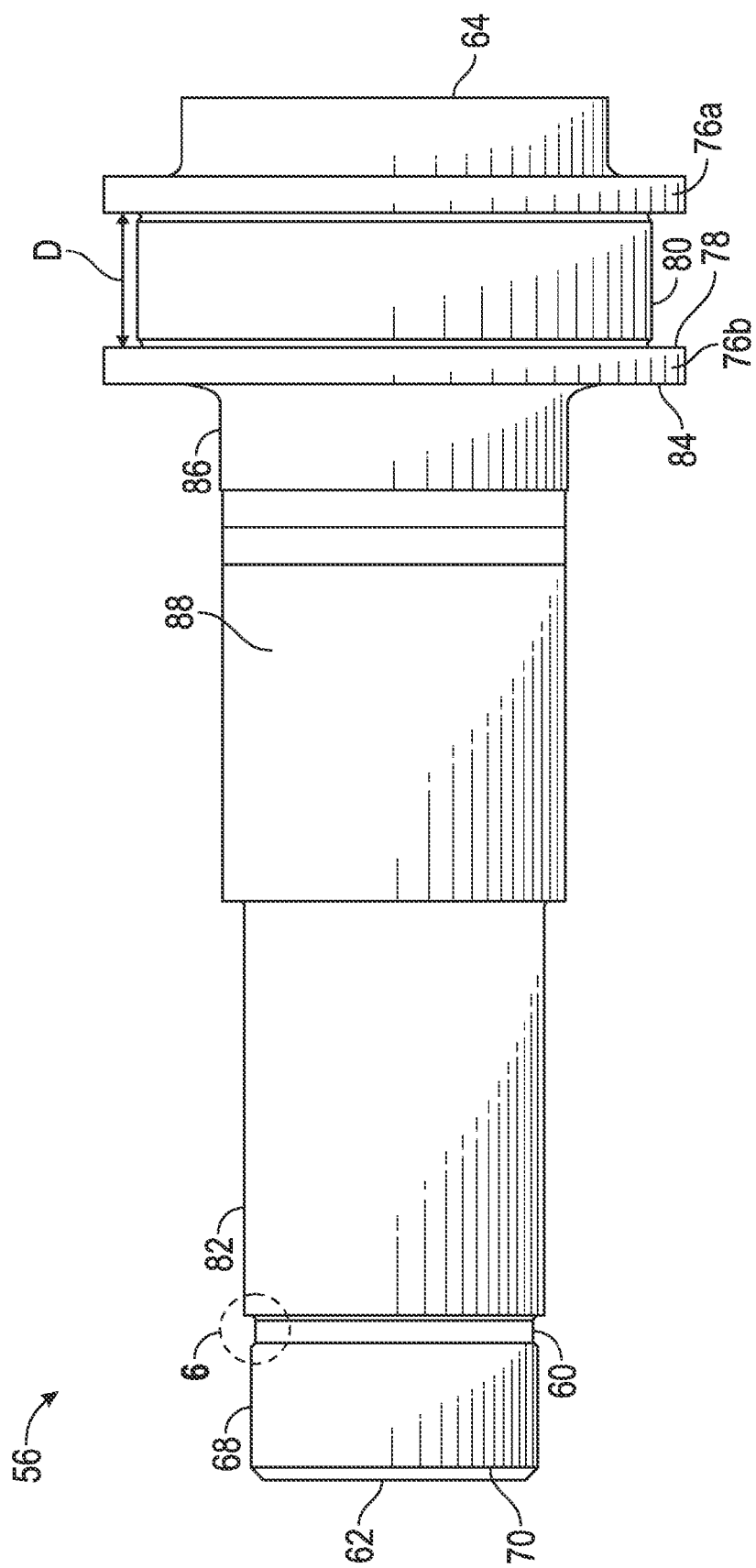
FIG. 5 is a side view of a fixed shaft configured for use in a hydraulic unit according to an embodiment of the invention.

Referring now to FIG. 3, an example of a hydraulic unit 32 of the IDG 16 is illustrated in more detail. The hydraulic unit 32 includes a variable displacement hydraulic pump 34 and a fixed displacement hydraulic motor 36. The pump 34 and motor 36 have respective cylinder blocks 38 and 40 which are arranged for rotation about a common axis A within a housing 42 on opposite sides of a stationary port plate 44 of the hydraulic unit 32. The port plate 44 is formed with apertures 46 through which hydraulic fluid communication between the pump 34 and the motor 36 is established during normal operation of the hydraulic unit 32. A biasing mechanism 48 resiliently biases the cylinder blocks 38, 40 in the direction of the port plate 44.

The operation of the hydraulic unit 32 in an IDG 16 of an aircraft involves transmission of torque from an engine of the airplane to an input, which rotates the input shaft 50 of the hydraulic unit 32 about axis A. The cylinder block 38 of the pump 34 is connected to the input shaft 50 for rotation therewith. Pistons 52 within the cylinder block 38 of the pump 34 are displaced during this rotation an amount which is a function of the setting of a variable swash plate 54 of the pump 34.

Hydraulic fluid under pressure from the pump 34 is delivered to the hydraulic motor 36 through the port plate 44 for rotating the cylinder block 40 and an output shaft 56 to which it is fixedly connected. The swash plate 58 of the motor 36 is fixed so that the operating speed of the motor 36 is a function of the displacement of the pump 34. The rotary output from output shaft 56 is added to or subtracted from the rotary motion from the engine through the conventional differential gearing of an IDG 16 for operating an electrical generator at a substantially constant rotational speed. That is, since the speed of the rotation from the airplane engine to the input 50 of the hydraulic unit 32 will vary, the position of the variable swash plate 54 is adjusted in response to these detected speed variations for providing the necessary reduction or increase in this speed for obtaining the desired constant output speed to the generator. During normal operation, there is a hydrostatic balance of the cylinder blocks and port plate. Although the hydraulic unit illustrated and described herein refers to the variable unit as a pump and the fixed unit as a motor, hydraulic units having other configurations, such as where the variable unit functions as a motor and the hydraulic unit operates as a pump for example, are within the scope of the invention.

Referring now to FIGS. 4-8, a fixed shaft 56 of the hydraulic unit 32 according to an embodiment of the invention is illustrated in more detail. The shaft 56 includes a substantially elongated non-uniform body 60 having a first end 62 and a second, opposite end 64. A relief 66 is formed about the circumference of the shaft 56 near the first end 62 to define a first portion 68 of the body 60 extending there between. In one embodiment, the first portion 68 of the body 60 has an outer diameter of about 0.6680+0.000−0.0005 inches (1.697+0.000−0.0013 centimeters). The first end 62 of the shaft 56 may include a chamfer 70 extending outwardly at about a 45°±2° angle such that the first end 62 of the body 60 has a diameter of about 0.615±0.015 inches (1.562±0.0381 cm). The relief 66 may be positioned such that a distance from the first end 62 of the shaft 56 to a far end 72 of the relief 66 is about 0.380±0.010 inches (0.965±0.0254 cm).

Figure 6:
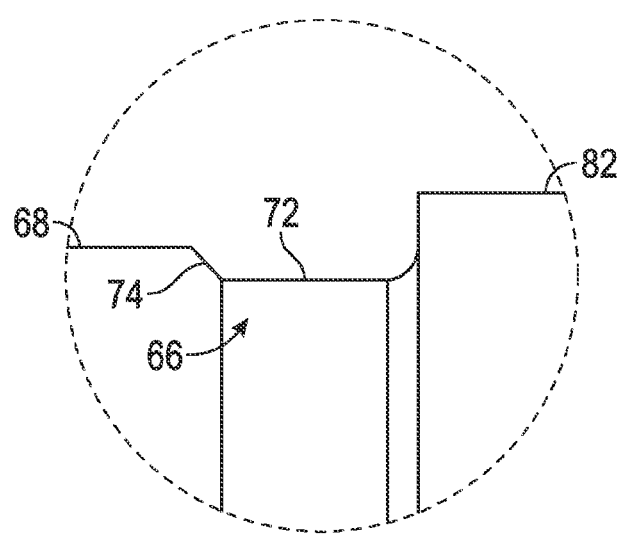
FIG. 6 is a detail view of section B of FIG. 5 according to an embodiment of the invention.
Figure 7:
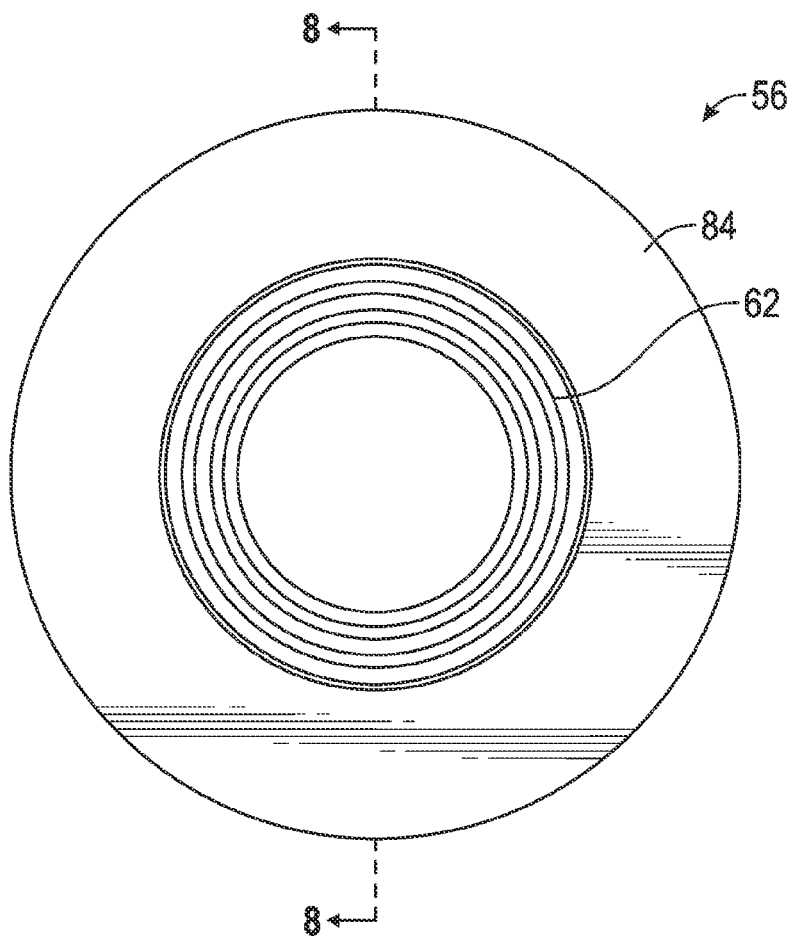
FIG. 7 is a top view of a fixed shaft configured for use in a hydraulic unit according to an embodiment of the invention.
Figure 8:
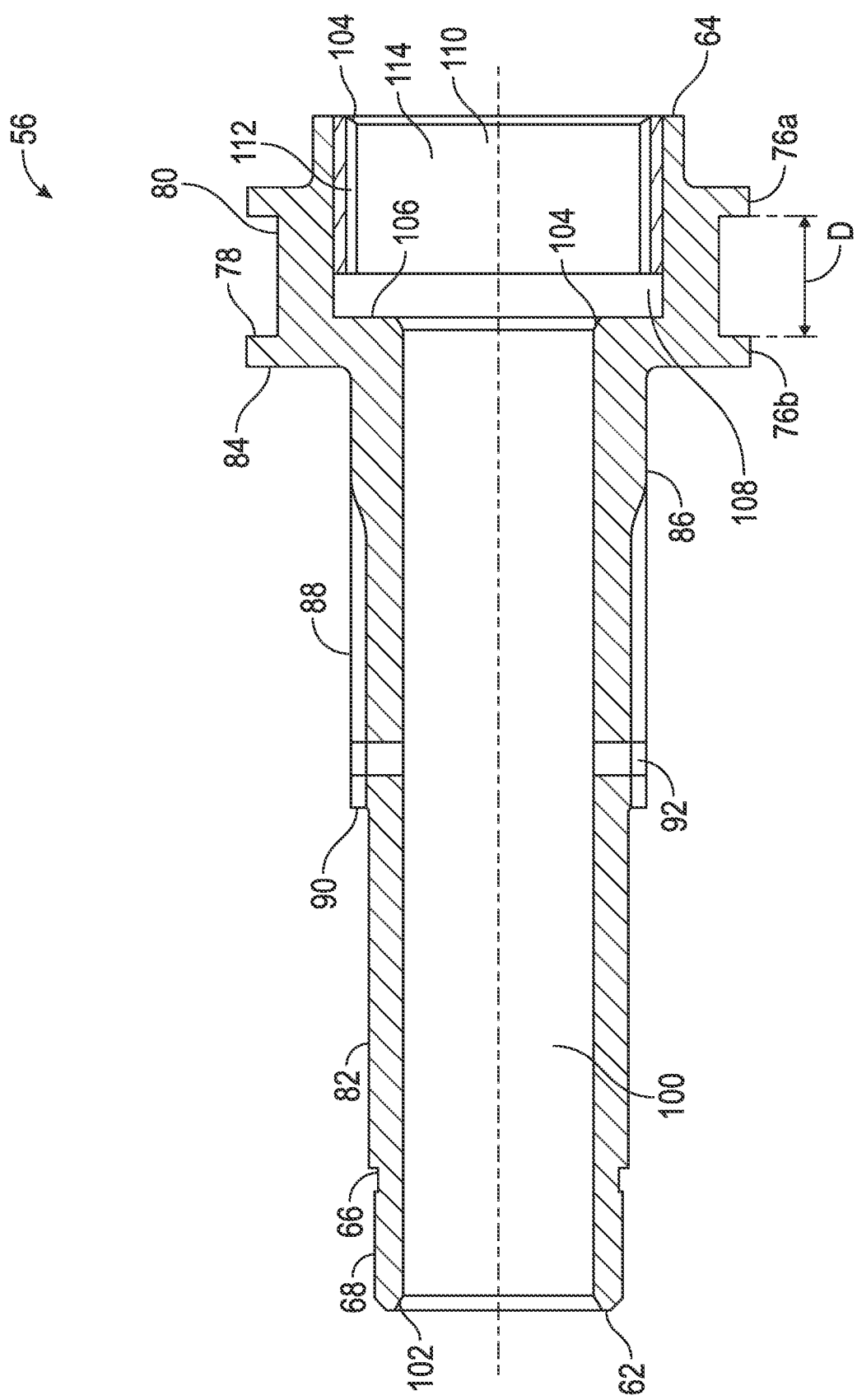
FIG. 8 is a cross-sectional side view taken along line A-A of FIG. 7 according to an embodiment of the invention.

Referring now to FIG. 6, the relief 66 is illustrated in more detail. In one embodiment, the relief 66 has a maximum length extending parallel to a longitudinal axis A of the shaft of 0.060 inches (0.1524 cm). The height or thickness of the relief 66 extending perpendicular to the longitudinal axis is about 0.010±0.005 inches (0.0254±0.0127 cm). The end 74 of the relief 66 closest to the first end 62 of the shaft 56 may include an angle and the opposite end 72 of the relief 66 may include a radius. In one embodiment, the angle is 45°±10° and the radius is about 0.010+0.010, −0.005 inches (0.0254+0.0254, −0.0127 cm).

The second end 64 of the shaft 56 has a diameter larger than the first end 62 of the shaft 56. In one embodiment, the second end 64 of the shaft 56 has an outer diameter of about 0.990±0.005 inches (2.515±0127 cm). Located near the second end 64 of the shaft 54 is a pair of identical flanges 76a, 76b, separated from one another by a distance D. The distance D between the first and second flange 76a, 76b is about 0.3162 inches (0.8031 cm). Each flange 76a, 76b may be configured to have an axial length of about 0.085±0.010 inches (0.216±0.0254 cm) and an outer diameter of about 1.359 inches (3.452 cm). In one embodiment, the distance from the first end 62 of the shaft 56 to an opposite surface 78 of the second flange 76b is about 2.622±0.005 inches (6.660±0.0127 cm). The portion 80 of the shaft 56 located between the first and second flanges 76a, 76b is configured to receive a bearing (not shown) and has an outer diameter larger than the outer diameter of the second end 64 of the shaft 56. In one embodiment, the portion 80 of the shaft 56 located between the flanges 76a, 76b has an outer diameter of about 1.2013 inches (3.051 cm). A radius may be formed at the interface between the first flange 76a and the outer diameter near the second end 64 of the shaft 56. In one embodiment, the radius is about 0.060±0.010 inches (0.152±0.0254 cm).

Arranged generally adjacent the relief 66, opposite the first portion 68 of the body 60 is a second portion 82. In one embodiment, the second portion 82 of the body 60 has an outer diameter of about 0.703±0.010 inches (1.786±0.0254 cm). Extending from a surface 84 of the second flange 76b, towards the second portion 82 of the body 60, is a third portion 86. In one embodiment, the third portion 86 extends a distance of about 0.250±0.030 inches (0.635±0.0762 cm) from the flange 76b and has an outer diameter of about 0.810±0.010 inches (2.057±0.0254 cm). A radius of about 0.094±0.010 inches (0.238±0.0254 cm) may be formed at the interface between the flange 76b and the third portion 86.

A plurality of first splines 88 may be formed in an exterior surface of the body 60 between the second portion 82 and the third portion 86. In one embodiment, the first splines 88 are constructed as detailed in Table 1. The plurality of first splines 88 may be positioned along the body 60 of the shaft 56 such that a distance from a first end 90 of the first splines 88 to surface 78 of the second flange 76b is about 1.269±0.010 inches (3.223±0.0254 cm). An axial length of the plurality of first splines 88 may be about 0.676±0.035 inches (1.717±0.089 cm).

TABLE 1

| External Spline Dimensions | |
| --- | --- |
| Type | Fillet Root Side Fit |
| Data for External Involute Splines | |
| Class | A |
| Pitch Diameter | .7750 in |
| No. of Teeth | 31 |
| Pitch Fraction | 40/80 |
| Base Circle Diameter | .6712 in |
| Pressure Angle | 30° |
| Max Form Diameter | .7500 in |
| Min Dim. Over Two Wires | .8436 in |
| Wire Size | 0.048 |
| Major Diam | .800 + .000-.005 in |
| Minor Diam | .725 + .000-.012 in |
| Additional Reqs when Max effective size is not gaged | |
| Max Profile Variation | .0010 in |
| Max Lead Variation | .0003 in |
| Circular Tooth Thickness Max Actual | .0371 in |
| Circular Tooth Thickness Min Actual | .0361 in |
| Max Diam Over Two Wires | .8452 in |
| Max Index Variation | .0015 in |

A through hole 92 used to supply lubricant to the shaft 56 may be formed in the portion of the body 60 including the first splines 88. In one embodiment, the through hole 92 has a diameter of about 0.095±0.005 inches (0.2413±0.0127 cm) and a center of the through hole 92 is located a distance of about 1.475 inches (3.747 cm) from the first end 62 of the shaft 56.

As shown in the figures, the variable shaft 50 is substantially hollow. A first hollow portion 100 extends inwardly from adjacent the second end 64 of the shaft 50. The first hollow portion 100 has an axial length of 0.364±0.010 inches (0.925±0.0254 cm) and an inner diameter of 0.938±0.010 inches (2.383±0.0254 cm). A radius of 0.060±0.010 inches (0.152±0.0254 cm) may be formed at the interface between the first hollow portion 100 the adjacent wall of the shaft 50. A chamfer 102 may be formed at the interior of the second end 64 of the shaft 50. In one embodiment, the chamfer 102 has an angle of 30°±5° such that an outer diameter of the chamfer at the second end of the shaft is about 1.031±0.015 inches (2.619±0.038 cm).

A first portion 108 of the hollow interior 100 of the shaft 56 arranged near the second end 64, at an axial position between the flanges, has an axial length of about 0.125±0.015 inches (0.3175±0.038 cm) extending from the end of the chamfer 104 to the second end 64 and an inner diameter of about 0.900±0.010 inches (2.286±0.0254 cm). A radius of 0.030±0.010 inches (0.0762±0.0254 cm) may be formed at the interface between the first portion 108 of the hollow interior 100 and the adjacent wall of the shaft. A plurality of second splines 112 may be integrally formed with a second portion 110 of the hollow interior 110 of the shaft 56. In one embodiment, the second splines 112 extend from an axial position between the flanges 76a, 76b to the second end 64 of the shaft 62. In one embodiment, the plurality of second splines 112 is constructed as detailed in Table 2. An inner diameter of the opening 114 formed between the second splines 112 may be 0.760±0.010 inches (1.930±0.0254 cm).

TABLE 2

Internal Spline Dimensions

| Type | Fillet Root Side Fit |
|---|---|
| Data for Internal Involute Splines | |
| Class | D |
| Pitch Diameter | .7500 in |
| No. of Teeth | 18 |
| Pitch Fraction | 24/48 |
| Base Circle Diameter | .6495 in |
| Pressure Angle | 30° |
| Max Form Diameter | .7917 in |
| Min Dim. Between Two Wires | .6885 in |
| Wire Size | 0.06 |
| Major Diam | .825 + .014-000 in |
| Minor Diam | .708 + .005-.000 in |
| Additional Reqs when MIN effective size is not gaged | |
| Max Profile Variation | .0010 in |
| Max Lead Variation | .0003 in |
| Circular Tooth Thickness Max Actual | .0684 in |
| Circular Tooth Thickness Min Actual | .0674 in |
| Min Diam Between Two Wires | .6868 in |
| Max Index Variation | .0015 in |

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A fixed shaft of a hydraulic unit, comprising:
a body having a first end and a second opposite end: and
a first flange and a substantially identical second flange integrally formed with the body of the shaft adjacent the second end, the second end of the body having an outer diameter of 0.990±0.005 inches (2.515±0127 cm), the first flange and the second flange each having an axial length parallel to a longitudinal axis of the body of about 0.085±0.010 inches (0.216±0.0254 cm) the first flange and the second flange having an outer diameter of 1.359 inches (3.452 cm), the first flange and the second flange being separated by from one another by a distance of about 0.3162 inches (0.8031 cm);
wherein a portion of the body between the first flange and the second flange has an outer diameter of about 1.2013 inches (3.051 cm);
wherein:
a relief is formed about a circumference of the body, a first portion of the body extending between the first end and the relief, a second portion of the body being arranged adjacent the relief, opposite the first portion, and a third portion of the body extending from adjacent the second flange towards the first end; and
an outer diameter of the first portion is 0.6680+0.000-0.0005 inches (1.697+0.000-0.0013 cm), an outer diameter of the second portion is 0.703±0.010 inches (1.786±0.0254 cm), and an outer diameter of the third portion is about 0.810±0.010 inches (2.057±0.0254 cm);
wherein:
a plurality of first splines are integrally formed with an exterior of the body between the second portion and the third portion;
a first end of the first splines located a distance of 1.269±0.010 inches (3.223±0.0254 cm) from a first surface of the second flange;
and the plurality of first splines has an axial length of about 0.676±0.035 inches (1.717±0.089 cm);
wherein the body has a substantially hollow interior and an inner diameter of the hollow interior adjacent the first portion, the second portion, the plurality of first splines, and the third portion of the body is about 0.517±0.010 inches (1.313±0.0254 cm); and
wherein a plurality of second splines are integrally formed with an interior surface of the body adjacent the second end, a first portion of the hollow interior being defined by the plurality of second splines such that the first portion of the hollow interior has an inner diameter of about 0.760±0.010 inches (1.930±0.0254 cm).

2. The fixed shaft according to claim 1, wherein a distance from the first end of the shaft to a first surface of the second flange is about 2.622±0.005 inches (6.660±0.0127 cm), the third portion of the shaft extends over an axial length from a second surface of the second flange of about 0.250±0.030 inches (0.635±0.0762 cm), and a distance from the first end of the shaft to a far end of the relief is about 0.380±0.010 inches (0.965±0.0254 cm).

3. The fixed shaft according to claim 1, wherein the relief has an axial length of about 0.060 inches (0.1524 cm) and a thickness extending perpendicular to the longitudinal axis of about 0.010±0.005 inches (0.0254±0.0127 cm), the relief including an angle formed at a first end thereof and a radius formed at a second end thereof, the angle being about 45°±10° and the radius being about 0.010+0.010, -0.005 inches (0.0254+0.0254, -0.0127 cm).

4. The fixed shaft according to claim 1, wherein a through hole is formed in a portion of the body extending through the first splines, the through hole having a diameter of about 0.095±0.005 inches (0.2413±0.0127 cm) and being located at an axial distance of about 1.475 inches (3.747 cm) from the first end.

5. The fixed shaft according to claim 4, wherein a second portion of the hollow interior, substantially aligned with the spacing between the first flange and the second flange has an inner diameter of 0.900±0.010 inches (2.286±0.0254 cm) and an axial length of about 0.125±0.015 inches (0.3175±0.038 cm).

* * * * *